Nov. 12, 1963 T. L. CLARK 3,110,389
ROTARY GRADING TABLE
Filed Sept. 19, 1960 2 Sheets-Sheet 1
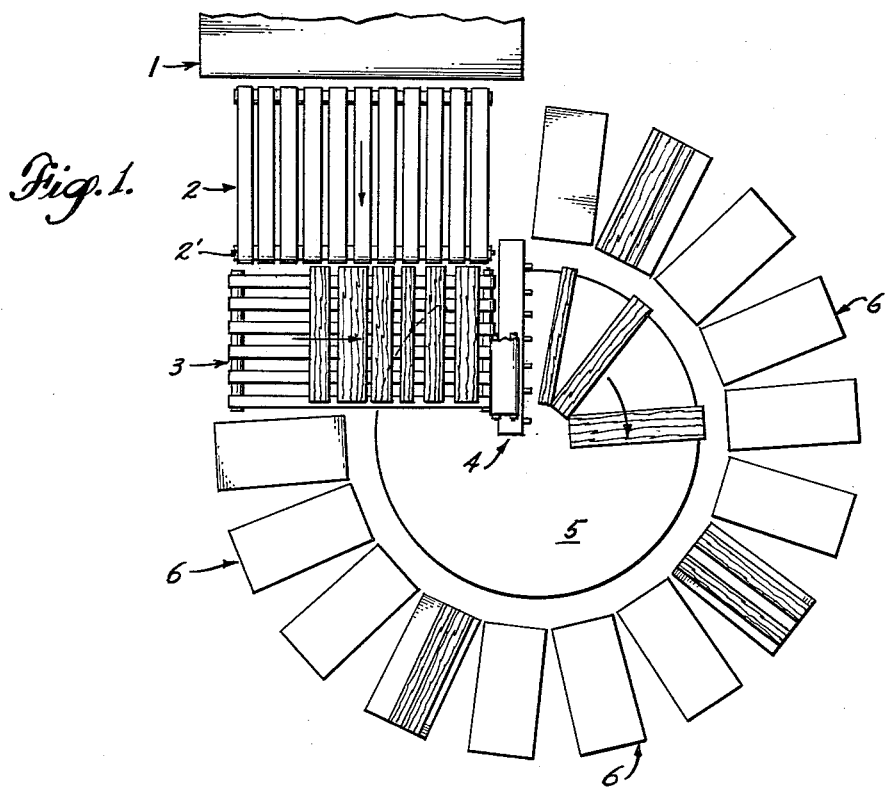
Fig.1.
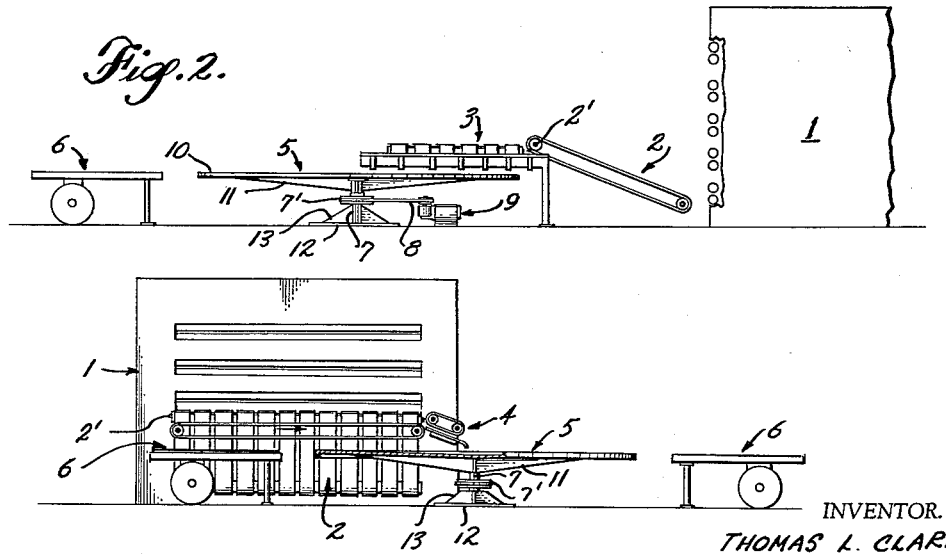
Fig.2.
Fig.3.
INVENTOR.
THOMAS L. CLARK
BY
Robert W. Black
ATTORNEY Nov. 12, 1963    T. L. CLARK    3,110,389
ROTARY GRADING TABLE
Filed Sept. 19, 1960    2 Sheets-Sheet 2
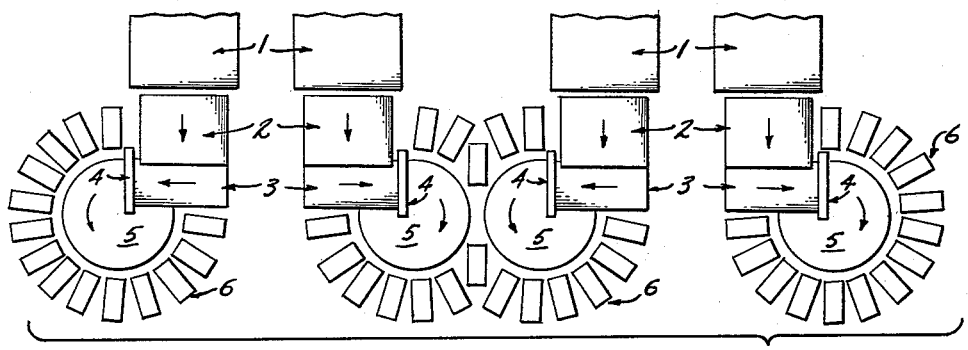
Fig. 4.
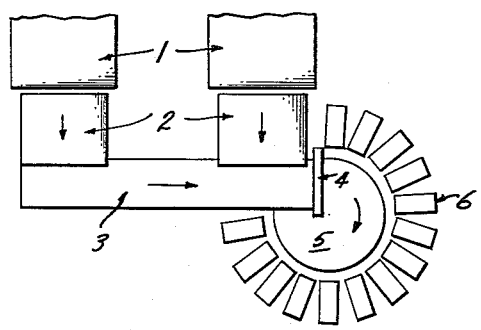
Fig. 5.
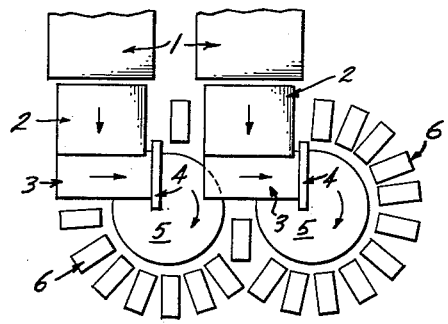
Fig. 6.
Fig. 7.
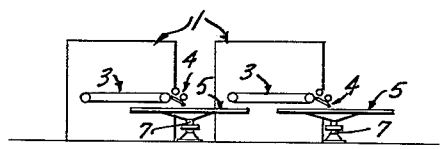
INVENTOR.
THOMAS L. CLARK
BY
Robert W. Beach
ATTORNEY 3,110,389
ROTARY GRADING TABLE
Thomas L. Clark, Seattle, Wash., assignor to Laucks Laboratories Inc., Seattle, Wash., a corporation of Washington
Filed Sept. 19, 1960, Ser. No. 57,001
2 Claims. (Cl. 198—103)

This invention relates to the apparatus and methods employing one or more straight conveyors and a rotary circular grading table for receiving sheets from the conveyors and from which the sheets are transferred to a plurality of graded stack supports.

An object of this invention is to provide a compact grading table by which sheets can be moved to a plurality of graded stack supports.

A further object of this invention is to provide a flexible and compact combination of straight conveyors, rotating circular grading tables, and a plurality of graded stack supports for each table which can be arranged in radiating fashion from the grading tables.

Adaptable to various processes and locations, the rotary grading table combined with straight conveyors and sheet accumulating stations eliminates the need for a long, straight, inflexible conveyor system for sheet grading.

The foregoing objects can be accomplished by combining a straight conveyor, by which the sheets are moved transversely of their length, located a short distance above a rotary grading table with the discharge end of the conveyor extending radially of the table to deposit onto the table successive sheets extending radially of the table. These sheets are then transported by the grading table in a circular path and selected sheets can be withdrawn endwise from such path onto graded stack supports arranged around the table in radiating fashion with the length of the sheet stack supports extending radially of the grading table.

FIGURE 1 is a plan view of a single apparatus unit including a rotary grading table and a plurality of stack supports arranged around such table.

FIGURE 2 is an elevation of the apparatus seen from the right side of FIGURE 1.

FIGURE 3 is a front elevation of the apparatus.

FIGURE 4 is a plan of a combination of more than one circular grading table and the respective grading stations or stack supports.

FIGURE 5 is a plan view of one circular grading table in combination with two supply conveyors or conveyor systems.

FIGURE 6 is a plan view of another combination of supply conveyors or conveyor systems, in this case with two circular grading tables and their respective grading stations, and FIGURE 7 is a front elevation of such combination.

Adapted to the grading of sheets, such as of veneer, this apparatus transports elongated strips or sheets of random width from a continuous travelling drier 1, such as by a tipple 2, to a straight conveyor 3. The tipple with one end 2' projecting above the straight conveyor can be swung about that end so the tipple will feed up or down an incline or horizontally from different levels of the drier 1 to the straight conveyor 3. Such conveyor moves in a direction perpendicular to the belts of tipple 2. The sheets then move lengthwise through the drier 1 and from it lengthwise along the tipple 2.

The sheets deposited on the liner receiving conveyor 3 are moved transversely of their length, passed over a moisture sensing device 4, and fed onto a rotary circumferentially continuous grading table 5 having a substantially circular outer periphery. Conveyor 3 is located slightly above the table 5 and in such overlapping relationship that the length of the conveyor is perpendicular to a radius of the table adjacent to the discharge end of the conveyor. Moreover, the discharge end of the conveyor is located eccentrically of the grading table so that one edge of the conveyor is approximately aligned with the axis of rotation of the table. Because of this relationship of the conveyor to the table the sheets of random widths are received on such grading table in positions substantially radially of the table and extending outward from the central portion of the table with one end of each sheet projecting beyond the outer periphery of the table, as shown in FIGURE 1. The table is rotated around an upright shaft 7 and the sheets lie in a plane perpendicular to such shaft.

The sheet accumulating supports 6 are arranged around the circular grading table 5 in positions radiating outward from it, and are spaced radially outward from the periphery of the grading table to enable workmen to walk and work between the grading table and the graded stack supports. Such grading table's center is offset from the centerline of the drier, as shown in FIGURE 1, so that all the sheets discharged endwise from the drier can be received on the cross conveyor 3 and can be transferred by it to the grading table and still provide a compact grading system. The arrangement of the graded stack supports around the circular grading table affords a maximum number of stations for the area occupied by the system.

Both conveyors 2 and 3 are powered by conventional means. As shown in FIGURE 2, the circular grading table 5 comprises a top plate 10, supported by the upright shaft 7 mounted on a floor plate 12. The shaft is aligned in a vertical position by and rotates within supports 13 attached to the floor plate. Sheave 7' is attached to upright shaft 7 between shaft supports 13 and table supports 11 and is turned by a chain or V-belt 8 driven by the vertical shaft of an electric motor 9. Supports 11 are attached to both the shaft 7 and the top plate 10.

FIGURES 2 and 3 show that the graded stack supports 6 may be wheeled trucks of the same vertical height approximately as the grading table to facilitate removal of sheets from the grading table to the stack supports.

In many of the locations in which the apparatus of this invention can be installed, a limited amount of space is available for grading sheets discharged from a plurality of processing lines, such as veneer driers. Yet in each case a fast grading operation is desired. The combinations of the straight conveyors, the circular rotating grading tables, and selected stack supports, as shown in FIGURES 4 through 7, help to compact, speed and facilitate sheet grading.

FIGURE 4 illustrates an arrangement in which four grading tables can be compactly arranged to serve two pairs of driers 1. In the center of the arrangement the two driers are spaced apart somewhat farther than the driers of the pairs. Each drier feeds a straight conveyor 3 moving perpendicular to the drier conveyor. The straight conveyors for the two center driers are pointed towards one another and each feeds a rotary grading table received principally between such driers and surrounded by stack supports. The grading table for the left of these two driers rotates clockwise while the right table rotates counter-clockwise. The straight transfer conveyors for the two outer driers are pointed away from each other and from the adjacent transfer conveyors. These outside grading tables rotate in the opposite direction from the rotary tables nearest to them respectively.

FIGURE 5 points out how two sheet supply lines can effectively feed one rotary grading table. In this case, the two parallel drier conveyors 1 and tipples 2 feed the single straight transfer conveyor 3 travelling perpendicular to the path of the sheet supply conveyors. Such transfer conveyor feeds the rotary grading table 5 rotating clockwise and surrounded by graded stack supports 6. With both this method and the method outlined in FIGURE 4 the drier or parallel supply conveyors can be spaced apart a distance less than the diameter of the grading table.

FIGURES 6 and 7 illustrate the most compact way to provide each of two sheet supply lines 1, 2 with its own grading table 5. In this case also, the drier or parallel supply conveyors are spaced apart a distance less than the diameter of a grading table.

The sheet supply lines in this instance are arranged so that each feeds a straight conveyor 3 traveling perpendicular to the supply conveyor. Each conveyor then deposits sheets upon a clockwise rotating grading table 5. As observed best in FIGURE 7, the grading tables are situated vertically below the straight conveyors and offset from the centerline of the drier, as discussed above. This enables one of the grading tables, such as the left grading table in FIGURES 6 and 7, to be compactly arranged below the conveyor systems of both sheet supply lines while being fed by only one of such lines.

I claim as my invention:

1. Apparatus for handling sheets of random width comprising a rotary circumferentially continuous table having a generally circular outer periphery, and a feed conveyor moving elongated sheets in generally parallel arrangement and in a direction transversely of their lengths, said conveyor being located at one side of the axis of rotation of said table and having its discharge end disposed perpendicular to the direction of movement of sheets along said conveyor and parallel to a radius of said table adjacent to said discharge end of said conveyor for deposit of such elongated sheets on said rotary table in positions offset from the center of said table, with their lengths extending generally radially of said table and with one of their ends projecting beyond the outer periphery of said table.

2. Apparatus for handling sheets of random width comprising a sheet supply line for transporting elongated sheets parallel to their lengths in substantially parallel coplanar relationship, a straight conveyor located at the end of said supply line for receiving sheets from said supply line, said conveyor moving perpendicular to the direction of movement of the sheets along said supply line for transporting such sheets in substantially parallel coplanar relationship transversely of their lengths, and a rotary circumferentially continuous planar table beneath the discharge end of said conveyor and receiving sheets from said conveyor, said conveyor being located with its discharge end perpendicular to the direction of movement of said conveyor and substantially directly above and parallel to a radius through the axis of rotation of said table for deposit of each such elongated sheet with its length disposed generally along such radius.

References Cited in the file of this patent

UNITED STATES PATENTS

| | | |
|---|---|---|
| 1,046,853 | Proal | Dec. 10, 1912 |
| 1,204,428 | Grandfield | Nov. 14, 1916 |
| 1,444,359 | Rand | Feb. 6, 1923 |
| 1,473,333 | Bickley | Nov. 6, 1923 |
| 1,567,080 | Ranney | Dec. 29, 1925 |
| 1,833,311 | Winkler et al. | Nov. 24, 1931 |